(12) United States Patent
Schalkwyk et al.

(10) Patent No.: US 8,682,661 B1
(45) Date of Patent: *Mar. 25, 2014

(54) ROBUST SPEECH RECOGNITION

(75) Inventors: Johan Schalkwyk, Scarsdale, NY (US); Bjorn Bringert, Bath (GB); David P. Singleton, London (GB)

(73) Assignee: Google Inc., Mountain View, CA (US)

( * ) Notice: Subject to any disclaimer, the term of this patent is extended or adjusted under 35 U.S.C. 154(b) by 373 days.

This patent is subject to a terminal disclaimer.

(21) Appl. No.: 12/872,428

(22) Filed: Aug. 31, 2010

(51) Int. Cl.
*G10L 15/00* (2013.01)

(52) U.S. Cl.
USPC ............ 704/231; 704/2; 704/235; 704/240; 704/255; 704/257

(58) Field of Classification Search
CPC ....... G10L 15/14; G10L 15/26; G10L 15/265; G06F 17/2872; G06F 17/289
USPC .................... 704/235, 240, 251, 255, 257, 2
See application file for complete search history.

(56) References Cited

U.S. PATENT DOCUMENTS

| | | | |
|---|---|---|---|
| 6,363,348 B1 | 3/2002 | Besling et al. | |
| 7,363,228 B2 | 4/2008 | Wyss et al. | |
| 7,412,391 B2 | 8/2008 | Nakagawa et al. | |
| 7,877,258 B1 | 1/2011 | Chelba et al. | |
| 2003/0236664 A1* | 12/2003 | Sharma | 704/251 |
| 2007/0100636 A1 | 5/2007 | Hirota et al. | |
| 2008/0208585 A1 | 8/2008 | Ativanichayaphong et al. | |
| 2008/0270135 A1* | 10/2008 | Goel et al. | 704/257 |
| 2009/0171659 A1 | 7/2009 | Pearce et al. | |
| 2009/0171663 A1 | 7/2009 | Badt et al. | |
| 2011/0196668 A1 | 8/2011 | Shu et al. | |

OTHER PUBLICATIONS

Bulyko, I. et al. "Web Resources for Language Modeling in Conversational Speech Recognition", ACM Trans. on Speech and Language Processing, Dec. 2007.*
LumenVox, "Grammars," retrieved on Jul. 31, 2010, http://www.lumenvox.com/pdf/grammars.pdf, 9 pages.

* cited by examiner

*Primary Examiner* — Vincent P Harper
(74) *Attorney, Agent, or Firm* — Fish & Richardson P.C.

(57) ABSTRACT

Methods, systems, and apparatus, including computer programs encoded on a computer storage medium, for recognizing speech input. In one aspect, a method includes receiving a user input and a grammar including annotations, the user input comprising audio data and the annotations providing syntax and semantics to the grammar, retrieving third-party statistical speech recognition information, the statistical speech recognition information being transmitted over a network, generating a statistical language model (SLM) based on the grammar and the statistical speech recognition information, the SLM preserving semantics of the grammar, processing the user input using the SLM to generate one or more results, comparing the one or more results to candidates provided in the grammar, identifying a particular candidate of the grammar based on the comparing, and providing the particular candidate for input to an application executed on a computing device.

12 Claims, 4 Drawing Sheets

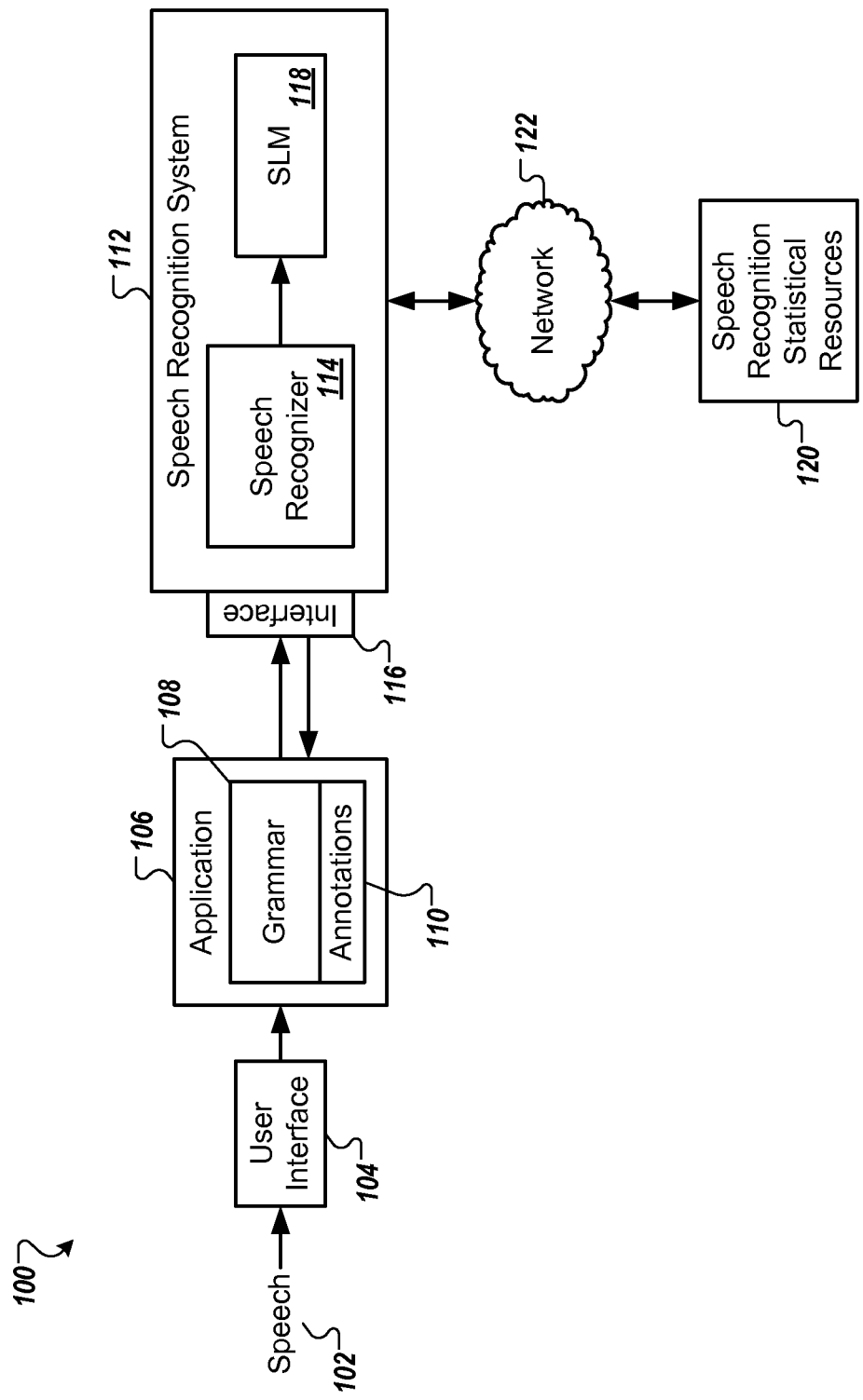

ROBUST SPEECH RECOGNITION

BACKGROUND

This specification generally relates to speech recognition.

Speech recognition converts a spoken word to text. In some cases, speech (words spoken by a person) can be an efficient way to provide input to a software application program. Examples of systems that utilize speech recognition to improve efficiency can include transcription systems, in particular medical transcription systems. In some cases, speech can be the input to software applications that control systems or devices when the use of other input methods by a user of the system is constrained by physical limitations. For example, the user may be unable to utilize their hands and/or eyes to provide system input as they are occupied with more important tasks. The pilot of a fighter jet may use spoken words to operate additional controls on the jet while in flight. The user of a mobile computing device may be driving a car while using voice commands to operate the mobile computing device (e.g., place a phone call).

SUMMARY

Implementations of the present disclosure are directed to the expansion of a base speech recognition grammar that may be provided with a voice-enabled application executed on a computing device. In some implementations, a developer provides the voice-enabled application and a base speech recognition grammar that includes annotations providing syntax and semantics to the speech recognition grammar. Speech input to the application, the base grammar and the annotations are provided to a speech recognition system that processes each to provide a statistical language model. The statistical language model provides an increased number of candidates relative to candidates provided in the base speech recognition grammar, while maintaining the underlying context and semantics of the base speech recognition grammar. A particular candidate can be selected based on the speech input and can be provided back to the voice-enabled application for further processing. Speech recognition statistical resources can be accessed to weight each of the grammar candidates, enhancing functionality of the voice-enabled application. Accordingly, a developer can provide voice-enabled applications with relatively simple and easy to construct speech recognition grammars, while implementations of the present disclosure enhance the grammars to expand and improve speech recognition results.

In general, innovative aspects of the subject matter described in this specification may be embodied in methods that include the actions of receiving a user input and a grammar including annotations, the user input comprising audio data and the annotations providing syntax and semantics to the grammar; retrieving third-party statistical speech recognition information, the statistical speech recognition information being transmitted over a network; generating a statistical language model (SLM) based on the grammar and the statistical speech recognition information, the SLM preserving semantics of the grammar; processing the user input using the SLM to generate one or more results; comparing the one or more results to candidates provided in the grammar; identifying a particular candidate of the grammar based on the comparing; and providing the particular candidate for input to an application executed on a computing device. Other implementations of this aspect include corresponding systems, apparatus, and computer programs, configured to perform the actions of the methods, encoded on computer storage devices.

These and other implementations may each optionally include one or more of the following features. For instance, generating the SLM includes retrieving a baseline SLM from computer memory; and modifying the baseline SLM based on the grammar and the statistical speech recognition information to generate the SLM; the operations further include determining a weight associated with each result of the one or more results based on the statistical speech recognition information, wherein identifying a particular candidate is further based on the weight associated with each result; processing the user input using the SLM to generate one or more results comprises applying a paraphrase function to the user input to generate the one or more results as one or more fragments; the operations further include assigning a weight to each fragment of the one or more fragments, the weight corresponding to a degree of similarity between the user input and a respective fragment; comparing the one or more results to candidates provided in the grammar includes: applying a paraphrase function to each of the one or more results to generate one or more paraphrased results; and comparing the one or more paraphrased results to the candidates; the operations further include: translating the user input to a second language, different than a first language of the user input; generating a plurality of translation hypotheses based on the translating; translating each translation hypothesis of the plurality of translation hypotheses to the first language to provide a plurality of translated hypotheses; and appending the plurality of translated hypotheses as results to the one or more results; the operations further comprise: determining that no candidate of the grammar corresponds to the one or more results based on the comparing; and generating an error indication in response to determining that no candidate of the grammar corresponds to the one or more results; the operations further include transmitting a request for additional user input; the one or more processors are provided in a server, and the user input and the grammar are transmitted to the server from a client computing device over a network; and the user input is received through a microphone of a computing device comprising the one or more processors.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 1 is a block diagram demonstrating a system that recognizes and interprets input speech.

Like reference numbers represent corresponding parts throughout.

DETAILED DESCRIPTION

Figure 2A:
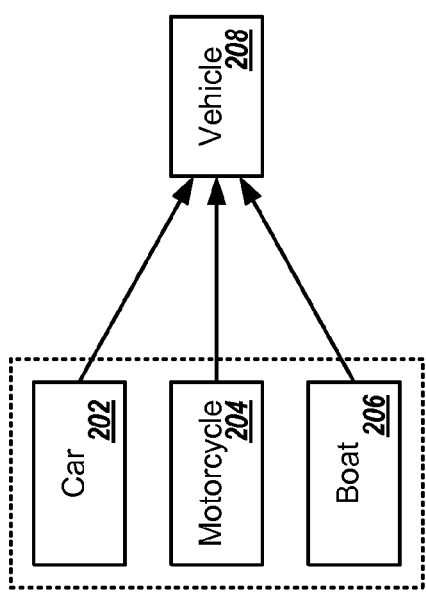
FIG. 2A is a block diagram showing terminal symbols and a non-terminal symbol.

A voice application running on a computing device can recognize and interpret input speech (input spoken words). The voice application can receive the input speech and supply the input speech along with a speech recognition grammar to a speech recognition system. The speech recognition grammar can include annotations (e.g., semantic interpretation tags) to the grammar that can supply the syntax and meaning of the grammar to the voice application. The speech recognition system can use a wide coverage statistical language model that includes the speech recognition grammar and its annotations to recognize and interpret the input speech. The speech recognition system can base the statistical language model on information obtained from a large knowledge base. The speech recognition system can use the statistical language model for broadening the speech recognition of the input speech while constraining the interpretation of the input speech output to the semantics defined in the provided speech recognition grammar.

The speech recognition system can use data obtained from one or more knowledge bases (e.g., the World Wide Web, query streams input to web-based query web sites, etc.) to generate or augment a statistical language model. The statistical language model combined with the speech recognition grammar can provide wider coverage for speech recognition than the speech recognition grammar alone, while preserving the semantics of the grammar. The speech recognition system can take the speech recognition grammar with its annotations and make speech recognition and interpretation more robust and accurate while preserving the semantics of the grammar. This allows the speech recognition system to better recognize words and word patterns. The speech recognition grammar can be used as an example of the kind of speech input expected by the voice application.

In some implementations, the voice application can be a web-based application running on a client computing device and the speech recognition system can be hosted on a server in communication with the web-based application on the client device using a network. In some implementations, the voice application can be an application running on a computer system that includes the speech recognition system.

FIG. 1 is a block diagram demonstrating a system 100 that recognizes and interprets speech input 102. In the example shown in FIG. 1, a user can activate a voice application 106 using a user interface 104 of a computing device. The computing device can be a mobile computing device or a desktop computing device. A user of a computing device using the user interface 104 of the computing device can select an icon that will activate the voice application 106 on the computing device. For example, once activated, the voice application 106 provides audio and/or visual output on a mobile computing device prompting the user to speak a voice command into a microphone on the mobile computing device. The mobile computing device records the audio input data for processing and interpretation by a speech recognition system 112. The recorded audio input data provided to an interface 116 of the speech recognition system 112 can be in a format used for encoding and storing audio data on a computer system (e.g., MPEG Audio Layer 3 (MP3), Windows Media Audio (WMA)).

Referring to FIG. 1, the voice application 106 determines a speech recognition grammar 108. The speech recognition grammar 108 includes words and word patterns. In some implementations, the words and word patterns are based on general grammar that can be spoken by a user. In some implementations, the words and word patterns included in the speech recognition grammar 108 are the expected type of audio input (spoken words) to the application. For example, a voice application on a mobile phone can include a speech recognition grammar that includes the words and word patterns for functions that can be performed by the mobile device (e.g., placing phone calls, sending text messages, etc.). The words and word patterns for the grammar of the voice application can be organized in multiple well-defined sets of strings, where each string has a precise meaning (e.g., "call home", "phone home", "call the office", "call Katie", etc.).

The voice application 106 provides the speech recognition grammar 108, annotations 110 and the recorded audio input data (spoken words) to the speech recognition system 112 through the interface 116. For example, the interface 116 understands the encoded format of the recorded audio input data and decodes the format, providing the decoded audio input data to a speech recognizer 114 for recognition. The speech recognition system 112 processes the audio input data using a statistical language model (SLM) 118 to generate one or more resultant raw text transcripts of the audio input data. The speech recognizer 114 attempts to match the one or more resultant raw text transcripts of the audio input data (spoken words) against a grammar (a word or word pattern entry) in the speech recognition grammar 108. The annotations 110 provide semantic processing instructions used to interpret the speech recognition grammar 108. A semantic processor included in the speech recognition system 112 uses the semantic processing instructions along with production rules defining the grammar for extracting semantic results from the identified resultant raw text transcript to determine a meaning for the literal text that can be understood by the voice application 106. The production rules determine how the grammar is put together to form meaningful word phrases or strings.

In some implementations, the speech recognition system 112 provides the results of the voice recognition (the raw text transcript) and the results of the voice interpretation (the semantic interpretation of the raw text) to the voice application 106. The speech recognition system 112 provides the results as output using interface 116 that is input to the voice application 106. The voice application 106 uses the results to perform an act. For example, a calendar voice application can use the results to set a calendar entry. In another example, a voice application on a mobile phone can use the results to place a phone call. In some implementations, the voice application 106 provides feedback of the results to the user using user interface 104. For example, the voice application 106 can provide audio and/or visual feedback of the raw text transcript of the recognized speech input to the user. In some implementations, the user, using user interface 104, provides verification of the recognized speech input to the voice application 106. For example, the user interface 104 can provide a selectable button that the user can activate to verify the recognized speech input results. In addition, the user interface can provide a selectable button that the user can activate that will negate the current returned results and allow the user to restate the speech input 102.

A voice application can simplify the recognition and interpretation of audio input speech by providing a grammar that restricts the possible recognizable word and word pattern inputs to a defined set of strings, where each string has a meaning. For example, the voice application 106 can simplify the recognition and interpretation of speech input 102 by defining the possible recognizable inputs to include in the speech recognition grammar 108. In some implementations, the grammar rules for the speech recognition grammar 108 can be based on a context-free grammar. A context-free grammar can provide a mechanism for describing the methods by which word phrases (word patterns) in a natural language are built from smaller blocks, capturing the "block structure" of sentences. The speech recognition grammar 108 can include production rules that specify which lexemes may replace which other lexemes.

The speech recognition grammar 108 includes a vocabulary of words, referred to as terminal symbols, which are the smallest building blocks of the grammar. Non-terminal symbols in the speech recognition grammar 108 are words or word patterns that can be replaced by a terminal symbol (a vocabulary word). In some cases, a non-terminal symbol can be a combination of terminal and other non-terminal symbols. For example, the speech recognizer 114 using the speech recognition grammar 108 provided by a calendar voice application (e.g., voice application 106) recognizes the raw text transcript date (e.g., "Tuesday the twenty-second of April") of the speech input 102 as a date. In the speech recognition grammar 108 for the calendar voice application (e.g., voice application 106), the days of the week (e.g., Sunday, Monday, . . . Saturday), the months in a year (e.g., January, February, . . . December), and dates (e.g., first, . . . twenty-first, . . . thirty first) are included in the speech recognition grammar 108. The speech recognition grammar 108 can include non-terminal symbols as building blocks for a date string that can include the non-terminal symbol "day of the week", the non-terminal symbol "month", and the non-terminal symbol "day". The interpretation of the raw text transcript is a date entry that can be interpreted for input to the calendar application, where the terminal symbol "Tuesday" can replace the non-terminal symbol "day of the week", the terminal symbol "twenty-second" can replace the non-terminal symbol "day", and the terminal symbol "April" can replace the non-terminal symbol "month". In addition, the speech recognition grammar 108 can include a non-terminal symbol "date" that includes the non-terminal symbols "day of the week", "month" and "date" that when combined form the interpretation of the date spoken by the user for entry into the calendar.

In some implementations, the speech recognizer 114 can return the string of terminal symbols that represents the recognized spoken words included in the user speech 102 (the recognized raw text transcript) to the voice application 106. The voice application 106 can extract the semantic meaning of the terminal symbols to determine the action the voice application 106 should perform. This can be a time consuming and cumbersome process to perform by the voice application 106. In some implementations, each production rule in the speech recognition grammar 108 can include an annotation (e.g., annotations 110) that is a function whose input is the interpretation of each non-terminal symbol (the string of terminal symbols) and whose output is the meaning of the string of interpreted non-terminal symbols (the meaning of the recognized spoken words of the user). The function applies a set of semantic rules to the string of terminal symbols to determine a meaning for the string of terminal symbols where the meaning can be expressed in a format understood by the voice application 106. The speech recognizer 114 can return the formatted meaning of the spoken words to the voice application 106 for input to the voice application 106 along with the raw text transcript of the speech input 102. The voice application 106 can perform the identified task verbally requested by the user as it understands the returned meaning of the recognized and interpreted speech input 102.

In some implementations, the speech recognition grammar 108 can be represented in a Speech Recognition Grammar Specification (SRGS) format. Using the SRGS format, the speech recognition grammar 108 can be specified using an Extensible Markup Language (XML) based format or an Augmented Backus-Naur Form (BNF) format. In an SRGS formatted speech recognition grammar 108, the annotations 110 can be included as tag elements. The speech recognizer 114 can interpret the tag elements in order to determine the meaning of the user speech input 102. The contents of the tag elements can be specified using a Semantic Interpretation for Speech Recognition (SISR) standard. The SISR standard defines the syntax and semantics of the annotations 110 to the speech recognition grammar 108. For example, the tag element can be a function expressed in an ECMAScript format (e.g., JavaScript). A voice browser (e.g., voice application 106) can run an ECMAScript for a tag element associated with a production rule in the speech recognition grammar 108 to semantically interpret the grammar and provide the interpreted information to the voice application 106 in a format the voice application 106 can understand and process.

The use of a speech recognition grammar (e.g., speech recognition grammar 108) with annotations (e.g., annotations 110) in a voice application (e.g., voice application 106) allows the developer of the voice application to isolate the language specific speech recognition and semantic interpretation in the grammar, and to provide a relatively simple grammar. The voice application can interface to a speech recognition system (e.g., speech recognition system 112) that provides the recognized raw text transcript of the input speech (e.g., speech input 102) along with the semantic interpretation of the raw text transcript in a format understood by the voice application. The voice application can process the language-independent semantic results returned by the grammar and perform the requested action spoken by the user.

In some implementations, a developer determining a speech recognition grammar for a voice application may not know or include all of the possible valid inputs a user may speak to request actions the voice application can perform. A grammar based speech recognition system may not recognize speech input that is not covered by the relatively simple speech recognition grammar provided by the developer. The grammar based speech recognition system uses grammar for both the recognition and interpretation of the input speech. Therefore, the grammar based speech recognition system may not be able to tell the difference between gibberish and linguistically well-formed speech input that falls outside of the coverage of the speech recognition grammar.

In some implementations, a statistical language model can be used for speech recognition in a speech recognition system, and to expand the speech recognition grammar provided by the developer. The statistical language model estimates the probability of a word or word pattern occurring in a given context of a recognized natural language. The statistical language model can estimate the probability distribution of the words and word patterns in the natural language. The speech recognition system can use data obtained from one or more knowledge bases or speech recognition statistical resources (e.g., the World Wide Web, query streams input to web-based query web sites, etc.) to generate or augment a statistical language model.

A voice application can include a base speech recognition grammar that includes terminal and non-terminal symbols and annotations to production rules to interpret the recognized raw text transcript and provide the meaning of the input speech to the application in order for the application to perform the requested act. The annotations to the production rules provide meaning to the recognized input speech for the voice application. The speech recognition grammar and annotations can be used by a speech recognition system. In some implementations, a general wide-coverage statistical language model for speech recognition can be used by a speech recognition system in place of the speech recognition grammar. The use of a general wide-coverage statistical language model for speech recognition can result in improved recognition of input speech as compared to the speech recognition grammar due to the possible large number of matches of speech input to grammar as a result of the wide-coverage of the language model. The use of a general statistical language model by a speech recognition system may result in the speech recognition system providing meaning to some and not all of the recognized input speech as it can be difficult to assign meaning to all recognized speech inputs of the statistical language model.

In some situations, the use of a general wide-coverage statistical language model for speech recognition in place of the speech recognition grammar can result in a reduction of the recognition accuracy of the input speech to the grammar. The reduction in recognition accuracy can occur because the general wide-coverage statistical language model is not application specific as compared to the speech recognition grammar determined by the voice application. The general wide-coverage statistical language model may not have any application specific knowledge of what the user may provide as speech input.

In the system 100 shown in FIG. 1, the SLM 118 can use statistical estimation techniques using language training data obtained from a large knowledge base consisting of speech recognition statistical resources (SRSR) 120. The SLM 118 can estimate the probability distribution of the words and word patterns in a natural language. The SRSR 120 can provide language training data form third party resources such as the World Wide Web, and query streams input to web-based query web sites. In some implementations, the SRSR 120 can reside on a computer readable storage device. The SRSR 120 can provide the language training data to the speech recognition system 112 by way of a network 122. The speech recognition system 112 can use the language training data provided by the SRSR 120 to augment and/or update an existing statistical language model (e.g., a baseline SLM stored in computer memory on the computing device hosting the speech recognition system 112) resulting in the SLM 118.

The speech recognizer 114 can use the SLM 118 to recognize and interpret speech input 102. In some implementations, the application 106 can provide the speech recognition grammar 108 with annotations 110 to the speech recognition system 112. The speech recognition system 112 can take the speech recognition grammar 108 and, using the language training data provided by the SRSR 120, can produce the SLM 118 for use by the speech recognizer 114 based on the speech recognition grammar 108. In some implementations, the speech recognition system 112 can take the speech recognition grammar 108 and, using the language training data provided by the SRSR 120, can adjust or modify an existing statistical language model producing SLM 118 for use by the speech recognizer 114.

In some implementations, the speech recognition system 112 can produce or adjust the SLM 118 based on the speech recognition grammar 108 and the language training data provided by the SRSR 120. The speech recognition system 112 can take a natural language text fragment (e.g., a word, word pattern or word phrase) from the speech recognition grammar 108 and produce a set of text fragments with similar meaning to thereby expand the grammar 108. Each text fragment can be assigned a weight based on the statistical information provided by the language training data from the SRSR 120. Additionally, the semantic interpretation of the text fragment is preserved and can be used for the set of text fragments with similar meaning. For example, a paraphrase function can take in a natural language text fragment and return a set of text fragments with similar meaning, where the function paraphrase can be expressed as: [Word]->[([Word], Weight)].

In some implementations, the speech recognition system 112 can take a non-empty sequence of consecutive terminal symbols from the speech recognition grammar 108 to use as the natural language text fragment for input to the paraphrase function. The paraphrase function can take each terminal symbol and return a weighted set of terminal symbols with similar meanings. Use of the paraphrase function on a non-empty sequence of consecutive terminal symbols to return a weighted set of terminal symbols for each input terminal symbol results in weighting and expanding the speech recognition grammar 108. In some implementations, the expanded weighted grammar based on the speech recognition grammar 108 can be processed by the speech recognition system 112. In some implementations, the expanded weighted grammar can be interpolated with an existing statistical model language and can be processed by the speech recognition system 112. For example, a non-empty sequence of consecutive terminal symbols from the speech recognition grammar 108 can be the digits "0" and "1." The paraphrase function can take the terminal symbol "0" as input and return "0," "zero" and "nothing" as having similar meaning. The paraphrase function can weigh "0" higher than "zero" and can weigh "zero" higher than "nothing," for example. The terminal symbols "zero" and "nothing" are now added to the speech recognition grammar 108 and are used in the SLM 118.

In some implementations, the speech recognition system 112 can take the speech recognition grammar 108 and produce all of the possible strings of terminal symbols using the production rules of the speech recognition grammar 108 and the included terminal symbols in the speech recognition grammar 108. This results in a corpus of strings of terminal symbols (text fragments). The corpus can be used to train and produce a statistical language model resulting in the SLM 118. In the case of a recursive grammar, the number of strings can be limited to prevent continual string formation. Producing all possible strings of terminal symbols using the production rules of the speech recognition grammar 108 and the included terminal symbols in the speech recognition grammar 108 results in weighing and expanding the originally provided, base speech recognition grammar 108. In some implementations, the expanded weighted grammar that is based on the speech recognition grammar 108 can be used as the SLM 118 in the speech recognition system 112. In some implementations, the expanded weighted grammar can be interpolated with an existing statistical model language and used as SLM 118 in the speech recognition system 112. For example, a speech recognition grammar for a calendar voice application can include multiple strings of terminal symbols for expressing a time of day. For example, a time of day can be expressed using common and different terminal symbols in a multitude of different strings (e.g., "eleven thirty", "quarter after eleven", and "thirty minutes past twelve"). A statistical language model can be produced that includes each string.

The speech recognizer 114 recognizes a raw text transcript of the speech input 102 using the SLM 118 by comparing the one or more raw text transcripts to candidates included in the speech recognition grammar 108 in the SLM 118. The raw text transcript that matches a candidate in the speech recognition grammar 108 in the SLM 118 is selected as the recognized raw text transcript. The recognized raw text transcript can be interpreted using the production rules included in the speech recognition grammar 108 that provided the basis for the SLM 118. For example, the speech recognizer 114 can compare one or more raw text transcripts of the input speech 102 to the grammar in the speech recognition grammar 108. Each raw text transcript is matched to the closest grammar productions (by some metric) in the speech recognition grammar 108. The raw text transcript that produces the closest match is selected as the recognized raw text transcript. The semantic interpretation for the production rules for the matching grammar production is used for the input raw text transcript. In some implementations, if all of the raw text transcripts cannot be matched to a grammar production within a certain metric, the speech recognition system 112 generates an out of grammar event. For example, the out of grammar event can be reported by the speech recognition system 112 to the voice application 106 and displayed to the user on user interface 104.

In some implementations, a raw text transcript recognition result, R, is produced by the speech recognizer 114 using SLM 118. The SLM 118 can include entries not present in the speech recognition grammar 108 but included in the raw text transcript. The speech recognition grammar 108 includes annotations 110. The annotations 110 provide semantic processing instructions used to interpret the speech recognition grammar 108. The speech recognition system 112 uses the semantic processing instructions along with production rules defining the grammar for extracting semantic results from the raw text transcript to determine a meaning for the literal text that can be understood by the voice application 106. The raw text transcript recognition result, R, can be interpreted by matching R to the closest grammar production (by some metric) in the speech recognition grammar 108. For example, R can be the natural language text fragment input to the paraphrase function. The returned set of text fragments, $R_1$-$R_n$, from the paraphrase function can be matched to the speech recognition grammar 108. Since the paraphrase function returns text fragments with similar meanings to the input text fragment, the semantic interpretation for a text fragment included in the returned set of text fragments (e.g., $R_1$) that matches a grammar production (by some metric) in the speech recognition grammar 108 can be used for the interpretation of R. If none of the text fragments in the returned set of text fragments, $R_1$-$R_n$, matches a grammar production in the speech recognition grammar 108, the process can continue by using the paraphrase function on one of the returned text fragments (e.g., $R_1$), which returns a second set of text fragments, $R_{11}$-$R_{1n}$ which can each be matched to the speech recognition grammar 108. The semantic interpretation of the text fragment included in the second set of text fragments (e.g., $R_{11}$) that matches a grammar production (by some metric) in the speech recognition grammar 108 can be used to interpret the input text fragment, raw text transcript recognition result, R. The use of the paraphrase function to determine the interpretation to use for the raw text transcript recognition result, R, can continue for a finite number of times until, if no match occurs, the speech recognition system 112 generates an out of grammar event. For example, the out of grammar event can be reported by the speech recognition system 112 to the voice application 106 and displayed to the user on user interface 104.

In some implementations, the speech recognition grammar 108 can be identified using a Uniform Resource Identifier (URI). For example, the voice application 106 can provide the URI to the speech recognition system 112 as the identifier for the speech recognition grammar 108. In some implementations, the speech recognition grammar 108 can be identified by its content by using a hash function.

In some implementations, the SLM 118 can use statistical estimation techniques using language training data obtained from a large knowledge base consisting of speech recognition statistical resources (SRSR) 120. The SRSR 120 can communicate with the speech recognition system 112 using the network 122. In some implementations, the SLM 118 can use statistical estimation techniques using language training data obtained from transcriptions of possible inputs to the system 100. In some implementations, the system 100 can allow a user to use text input or manipulate the user interface to communicate their command to the voice application 106 in the event that the system 100 generates an out of grammar event. In some cases, the user input can be used as training data for the SLM 118.

In some implementations, the paraphrase function can be implemented by first translating the natural language text fragment for input to the paraphrase function to a language-neutral representation (interlingua) and translating the language-neutral representation back to the natural language text fragment. In some implementations, the paraphrase function can be implemented by first translating the natural language text fragment for input to the paraphrase function to another natural language representation. Selecting a language for translation that is not related to the natural language of the text fragment for input can result in obtaining a wide variety of language expansions generated by the paraphrase function. Using a natural language translation of the text fragment for input as opposed to a language-neutral representation or an interlingua can allow the use of a non-interlingua based statistical machine translation to be used for the natural language translation of the text fragment for input to the paraphrase function.

For example, an application developer can determine a speech recognition grammar for an application that schedules calendar events that includes voice recognition. An example part of the speech recognition grammar is:
<INPUT>::="add" "an" "event"<TIME>{$=add_event ($1)}
<TIME>::="today" {$="time_today"}|"tomorrow"{$="time_tomorrow"}

If a user says "add an event today," a speech recognition system can return the interpretation: add_event (time_today) using the speech recognition grammar. If the user says "schedule an event today," the speech recognition system will not recognize the speech input as it is not included in the speech recognition grammar. The speech recognition system can generate an out of grammar event.

In the system 100 of FIG. 1, the speech recognition system 112 includes a speech recognizer 114 that uses the SLM 118 described previously in the specification. For example, an application developer can determine a speech recognition grammar 108 for a voice application 106 that schedules calendar events. An example part of the speech recognition grammar is:
<INPUT>::="add" "an" "event"<TIME>{$=add_event ($1)}
<TIME>::="today" {$="time_today"}|"tomorrow" {$="time_tomorrow"}

If a user says "add an event today" (e.g., speech input 102), the speech recognition system 112 can return the interpretation: add_event (time_today) to the application 106 using the speech recognition grammar 108 and SLM 118. The interpretation: add_event (time_today) is formed by using the annotations 110 for the production rules for the speech recognition grammar 108. If the user says "schedule an event today" (e.g., speech input 102), the speech recognition system 112 can recognize the speech input 102 but returns, as a hypothesis, the misrecognized phrase "schedule an event to dave".

For example, the speech recognition system 112 can attempt to translate the raw text transcript for both speech inputs: "add an event today" and "schedule an event today" to Japanese. The translation of the raw text transcript to Japanese can result in several possible translations for each raw text transcript. The possible translations are then translated back to English from Japanese. Table 1 shows the English translation of the possible recognizable raw text transcripts for each speech input.

TABLE 1

"schedule an event today"
"schedule an event this day"
"schedule an event to Dave"
"schedule an event for Dave"
"schedule an happening today"
"schedule an happening this day"
"schedule an happening to Dave"
"schedule an happening for Dave"
"add an event today"
"add an event this day"
"add an event to Dave"
"add an event for Dave"
"add an happening today"
"add an happening this day"
"add an happening to Dave"
"add an happening for Dave"
"schedule one event today"
"schedule one event this day"
"schedule one event to Dave"
"schedule one event for Dave"
"schedule one happening today"
"schedule one happening this day"
"schedule one happening to Dave"
"schedule one happening for Dave"
"add one event today"
"add one event this day"
"add one event to Dave"
"add one event for Dave"
"add one happening today"
"add one happening this day"
"add one happening to Dave"
"add one happening for Dave"

Of the list of possible translations for the speech inputs, only "add an event today" is included in the speech recognition grammar 108. Therefore, this translation is chosen. The interpretation for the raw text transcript ("add an event today") of the speech input 102 is add_event (time_today) as indicated in the annotations 110 to the speech recognition grammar 108.

In some implementations, each entry in Table 1 of possible translations for the speech inputs can include a weight. The weights can be determined from the confidence level in the speech recognition and translation. In some cases, more than one translation can be identified as a recognition possibility. Each translation can be returned to the application 106 including a corresponding weight. The application 106 can determine the most likely match based on the weights of the returned translation results.

In some implementations, the user interface 104, application 106 and speech recognition system 112 can be provided in a computing device. Example computing devices can include a desktop computer, a laptop computer, a personal digital assistant (PDA), and/or a mobile computing device, such as a smartphone. The computing device can communicate with the SRSR 120 over the network 122. In some implementations, the user interface 104 and the application 106 can be provided in a first computing device, and the speech recognition system 112 with the interface 116 can be provided in a second computing device. The first computing device and the second computing device can communicate with one another over a network (e.g., the network 122). The first computing device can include a desktop computer, a laptop computer, a personal digital assistant (PDA), and/or a mobile computing device, such as a smartphone, and the second computing device can include a back-end server that executes or hosts the speech recognition system 112. The second computing device can communicate with the SRSR 120 over the network 122.

FIG. 2A is a block diagram 200 showing terminal symbols 202, 204, 206 and a non-terminal symbol 208. The terminal symbols 202, 204, 206 and the non-terminal symbol 208 can be included in the speech recognition grammar 108 in FIG. 1. As described, the speech recognition grammar 108 can include a vocabulary of words such as terminal symbols 202, 204, 206. The non-terminal symbol 208 in the base speech recognition grammar 108 can be replaced by terminal symbols 202, 204, 206. FIG. 2A shows a simple grammar where terminal symbol 202 ("car"), terminal symbol 204 ("motocycle") and terminal symbol 206 ("boat") will each be recognized by speech recognizer 114 and interpreted as a "vehicle" (non-terminal symbol 208). Therefore, if the speech input 102 was "boat," "motocycle" or "car," the speech recognizer 114 using the base speech recognition grammar 108 would recognize the speech input 102 as a "vehicle." However, a user can speak alternative vehicle names not included in the base speech recognition grammar 108 such as "ship," "train" or "bicycle." Using the base speech recognition grammar that includes terminal symbols 202, 204, 206 and a non-terminal symbol 208, the speech recognizer would not recognize "ship," "train" or "bicycle" as a "vehicle" and would generate an out of grammar error to the user.

Figure 2B:
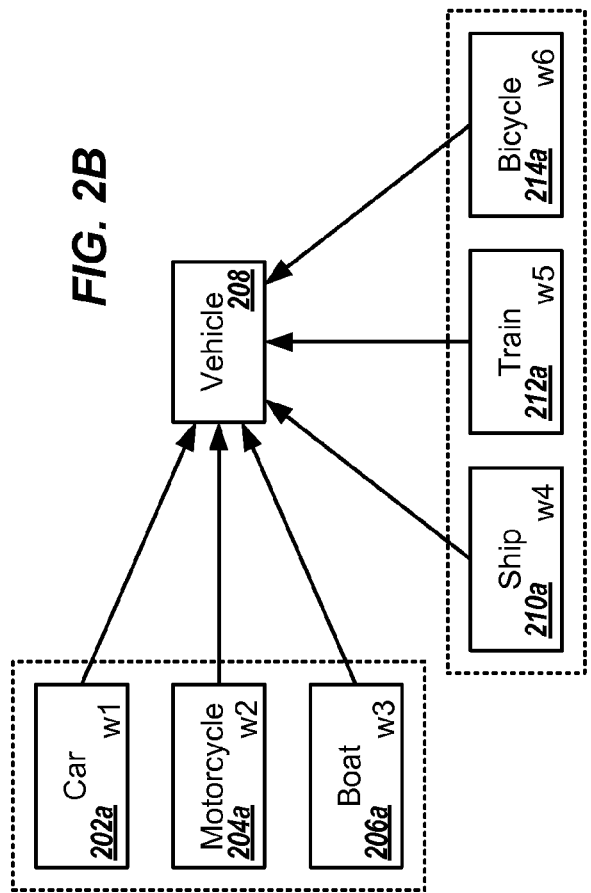
FIG. 2B is a block diagram showing weighted terminal symbols and a non-terminal symbol.

FIG. 2B is a block diagram 220 showing an enhanced speech recognition grammar that includes weighted terminal symbols 202a, 204a, 206a, 210a, 212a, 214a and non-terminal symbol 208. The weighted terminal symbols 202a, 204a, 206a, 210a, 212a, 214a and non-terminal symbol 208 can be included in the SLM 118 shown in FIG. 1.

As described, SRSR 120 can provide language training data to the speech recognition system 112 by way of network 122. The speech recognition system 112 can use the language training data provided by the SRSR 120 to augment and/or update an existing statistical language model resulting in the SLM 118. The base speech recognition grammar 108 can be interpolated with the SLM 118. Each word included in the SLM 118 can be assigned a weight based on the statistical information provided by the language training data from the SRSR 120. For example, referring to FIG. 2B, the SRSR 120 can provide additional terminal symbols that can be weighted resulting in weighed terminal symbols 210a, 212a, 214a. The SLM 118 can use statistical estimation techniques using language training data obtained from the SRSR 120 to weigh the terminal symbols resulting in weighed terminal symbols 202a, 204a, 206a, 210a, 212a, 214a.

Various techniques were described that can be used to preserve the semantics of the original terminal symbols 202, 204, 206 while expanding the grammar to include newly added weighted terminal symbols 210a, 212a, 214a whose context and/or semantics are the same as terminal symbols 202, 204, 206. In the example shown in FIG. 2A and referring to FIG. 1, the base speech recognition grammar 108 can include a vocabulary of words such as terminal symbols 202, 204, 206. The non-terminal symbol 208 in the speech recognition grammar 108 can be replaced by terminal symbols 202, 204, 206. Referring to FIG. 2B and FIG. 1, the enhanced or expanded speech recognition grammar can include the additional terminal symbols 210, 212, 214. The speech recognition grammar 108 can be interpolated with the SLM 118. The weighted terminal symbol 202a ("car"), weighted terminal symbol 204a ("motocycle"), weighted terminal symbol 206a ("boat"), weighted terminal symbol 210a ("ship"), weighted terminal symbol 212a ("train") and weighted terminal symbol 214a ("bicycle") will be recognized by speech recognizer 114 and interpreted as a "vehicle" (non-terminal symbol 208). Therefore, if the speech input 102 was "boat," "motocycle" or "car," the speech recognizer 114 using either the base speech recognition grammar, or the expanded speech recognition grammar, would recognize the speech input 102 as a "vehicle." A user can speak alternative vehicle names not included in the base speech recognition grammar, such as "ship," "train," or "bicycle," that will also be recognized by the speech recognizer 114, because they are included in the expanded speech recognition grammar.

In addition, each terminal symbol in the expanded speech recognition grammar can be assigned a weight (e.g., w1, w2, w3, w4, w5, w6) based on statistical information provided by the language training data from the SRSR 120. This results in weighted terminal symbols 202a, 204a, 206a, 210a, 212a, 214a, respectively. The semantic interpretation of the terminal symbols is maintained for the weighted terminal symbols. The use of weighted terminal symbols enables the speech recognizer to more quickly and easily determine a match between the speech input and the SLM 118. The speech input can be compared to the terminal symbols in their weight order, with the highest weighted terminal symbols used first in the comparison.

An application developer can determine a simple speech recognition grammar that can be application specific. A speech recognition system can use statistical data provided by speech recognition statistical resources to expand and weight the speech recognition grammar provided by the developer to generate a statistical language model that provides wider recognition coverage of input speech while preserving the sematic interpretation of the speech recognition grammar. Weighting the grammar included in the SLM 118 can improve the throughput of the system 100. Expanding the grammar provided by the developer increases the recognition probability without adding additional grammar to the SLM 118 that may not be relevant to the application 106.

Figure 3:
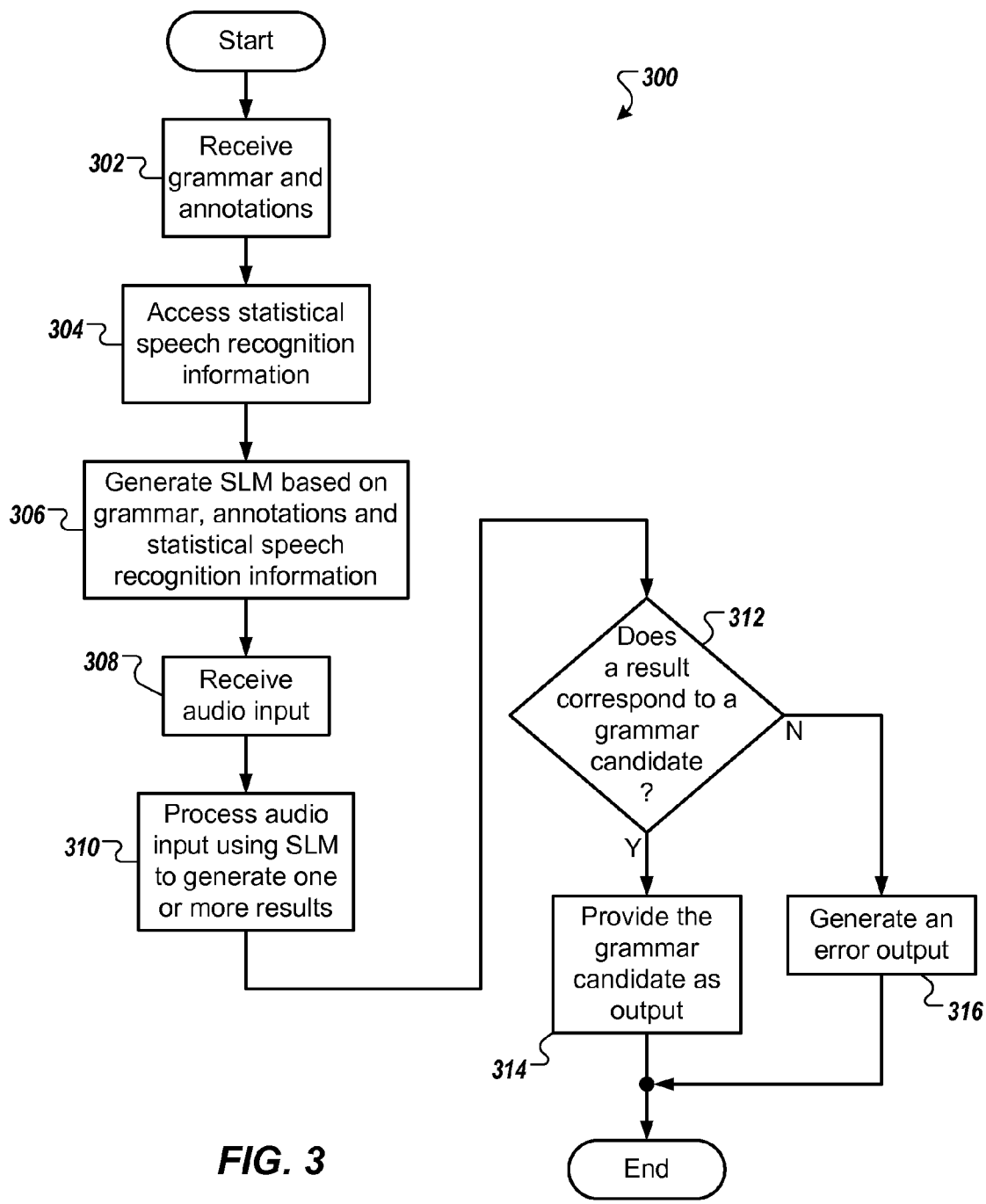
FIG. 3. is a flowchart of an example process for recognizing input speech.

FIG. 3. is a flowchart of an example process 300 for recognizing input speech. The process 300 can be described with reference to FIG. 1. The process 300 begins by receiving a grammar and annotations (302). For example, the voice application 106 can provide the speech recognition grammar 108 and annotations 110 to the speech recognition system 112 using interface 116. Statistical speech recognition information is accessed (304). For example, the speech recognition system 112 using network 122 accesses the SRSR 120. The SLM is generated based on the grammar, annotations and the statistical speech recognition information (306). For example, the speech recognition system 112 uses the statistical information and language training data provided by the SRSR 120 to generate a statistical language model resulting in the SLM 118. The speech recognition system can interpolate the speech recognition grammar 108 with the generated SLM 118. The SLM 118 preserves the semantic interpretation of the grammar provided by the base speech recognition grammar 108 included in the annotations 110. The audio input is received (308). For example, the voice application 106 provides the speech input 102 to the speech recognition system 112.

The audio input is processed using the SLM to generate one or more results (310). It is determined whether a result corresponds to a grammar candidate (312). If a result corresponds to a grammar candidate, the grammar candidate is provided as an output (314). For example, the speech recognition system 112 recognizes the speech input 102 by comparing the speech input 102 to the grammar in the SLM 118 resulting in a match. The process 300 ends. If the result does not correspond to a grammar candidate, an error output is generated (316). For example, if the speech recognition system 112 does not recognize the speech input 102 (i.e., the speech input 102 does not match any of the grammar in the SLM 118) an out of grammar event can occur and an output error can be sent to the application 106. The application 106 can provide the error to the user interface 104. The application can request the user reenter additional input and the user can then provide the speech input 102 to the system 100. The process 300 ends.

Figure 4:
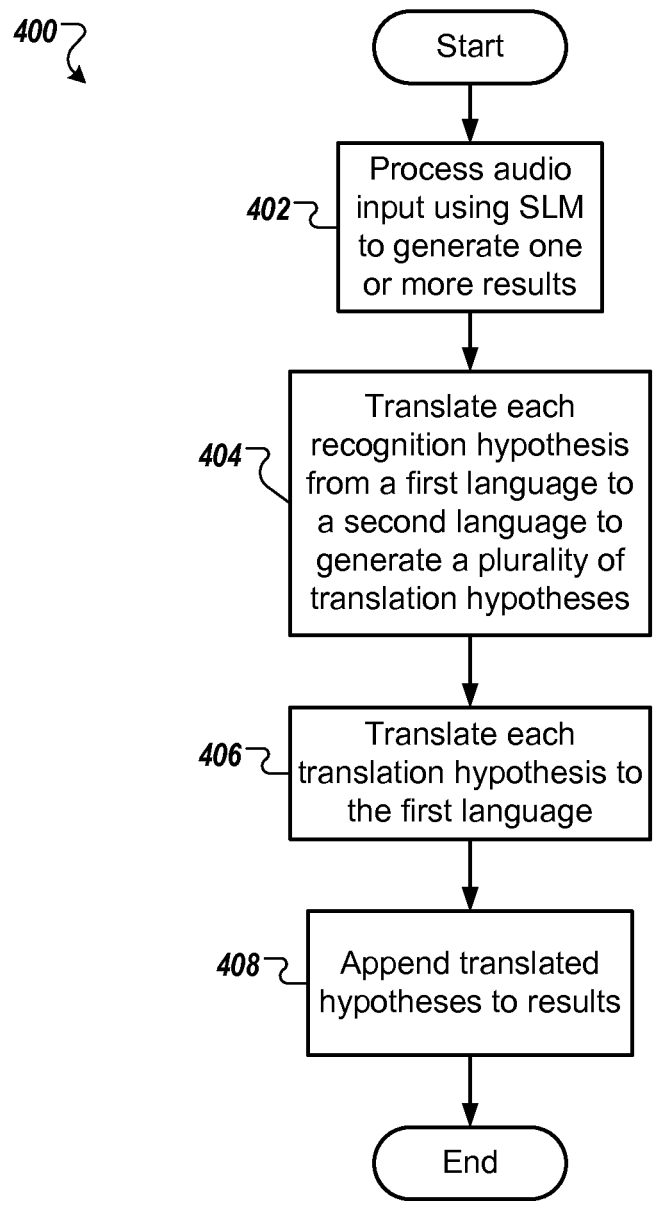
FIG. 4 is a flowchart of an example process for recognizing input speech using intermediate language translations.

FIG. 4 is a flowchart of an example process 400 for recognizing input speech using intermediate language translations. The process 400 can be described with reference to FIG. 1. The process 400 begins by processing audio input using an SLM to generate one or more results (402). For example, the speech recognizer 114 of the speech recognition system 112 processes the speech input 102 received from application 106 using SLM 118. The speech recognizer 114 generates one or more results, where each result represents a recognition hypothesis for the speech input 102. Each recognition hypothesis is translated from a first language to a second language to generate a plurality of translation hypotheses in the second language (404). For example, the raw text transcript of the speech input 102 is translated from a first language to a second language. The translation generates a plurality of translation hypotheses. Each translation hypothesis is translated from the second language to the first language (406). The translated hypotheses are appended to the results (408). For example, as shown in Table 1, the list of translated hypotheses can be used as raw text transcript results that are compared to the grammar candidates in the SLM 118.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementation s are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system comprising:
   one or more processors;
   a computer-readable medium coupled to the one or more processors having instructions stored thereon which, when executed by the one or more processors, cause the one or more processors to perform operations comprising:
   receiving a user input and a grammar including annotations, the user input comprising audio data and the annotations providing syntax and semantics to the grammar;

retrieving, from computer memory, an existing statistical language model (SLM) that is based on the grammar;

retrieving third-party statistical speech recognition information that is transmitted over a network, the third-party statistical speech recognition information including query streams input to web-based query web sites;

updating the existing SLM based on the statistical speech recognition information transmitted over the network;

processing the user input using the updated SLM to generate one or more results, the updated SLM preserving semantics of the grammar;

comparing the one or more results to candidates provided in the grammar;

identifying a particular candidate of the grammar based on the comparing;

providing the particular candidate for input to an application executed on a computing device;

translating the user input to a second language, different than a first language of the user input;

generating a plurality of translation hypotheses based on the translating;

translating each translation hypothesis of the plurality of translation hypotheses to the first language to provide a plurality of translated hypotheses; and appending the plurality of translated hypotheses as results to the one or more results.

2. The system of claim 1, wherein the operations further comprise determining a weight associated with each result of the one or more results based on the statistical speech recognition information, wherein identifying a particular candidate is further based on the weight associated with each result.

3. The system of claim 1, wherein processing the user input using the updated SLM to generate one or more results comprises applying a paraphrase function to the user input to generate the one or more results as one or more fragments.

4. The system of claim 3, wherein the operations further comprise assigning a weight to each fragment of the one or more fragments, the weight corresponding to a degree of similarity between the user input and a respective fragment.

5. The system of claim 1, wherein comparing the one or more results to candidates provided in the grammar comprises:
applying a paraphrase function to each of the one or more results to generate one or more paraphrased results; and
comparing the one or more paraphrased results to the candidates.

6. A system comprising system:
one or more processors;
a computer-readable medium coupled to the one or more processors having instructions stored thereon which, when executed by the one or more processors, cause the one or more processors to perform operations comprising:
receiving a user input and a grammar including annotations, the user input comprising audio data and the annotations providing syntax and semantics to the grammar;
retrieving, from computer memory, an existing statistical language model (SLM) that is based on the grammar;
retrieving third-party statistical speech recognition information that is transmitted over a network;

updating the existing SLM based on the statistical speech recognition information transmitted over the network;

processing the user input using the updated SLM to generate one or more results, the updated SLM preserving semantics of the grammar;

comparing the one or more results to candidates provided in the grammar;

identifying a particular candidate of the grammar based on the comparing;

providing the particular candidate for input to an application executed on a computing device;

translating the user input to a second language, different than a first language of the user input;

generating a plurality of translation hypotheses based on the translating;

translating each translation hypothesis of the plurality of translation hypotheses to the first language to provide a plurality of translated hypotheses; and appending the plurality of translated hypotheses as results to the one or more results.

7. The system of claim 1, wherein the operations further comprise:
determining that no candidate of the grammar corresponds to the one or more results based on the comparing; and
generating an error indication in response to determining that no candidate of the grammar corresponds to the one or more results.

8. The system of claim 7, wherein the operations further comprise transmitting a request for additional user input.

9. The system of claim 1, wherein the one or more processors are provided in a server, and the user input and the grammar are transmitted to the server from a client computing device over a network.

10. The system of claim 1, wherein the user input is received through a microphone of a computing device comprising the one or more processors.

11. A computer-readable medium coupled to one or more processors having instructions stored thereon which, when executed by the one or more processors, cause the one or more processors to perform operations comprising:
receiving a user input and a grammar including annotations, the user input comprising audio data and the annotations providing syntax and semantics to the grammar;
retrieving, from computer memory, an existing statistical language model (SLM) that is based on the grammar;
retrieving third-party statistical speech recognition information that is transmitted over a network, the third-party statistical speech recognition information including query streams input to web-based query web sites;
updating the existing SLM based on the statistical speech recognition information transmitted over the network;
processing the user input using the updated SLM to generate one or more results, the updated SLM preserving semantics of the grammar;
comparing the one or more results to candidates provided in the grammar;
identifying a particular candidate of the grammar based on the comparing;
providing the particular candidate for input to an application executed on a computing device;
translating the user input to a second language, different than a first language of the user input;
generating a plurality of translation hypotheses based on the translating;

translating each translation hypothesis of the plurality of translation hypotheses to the first language to provide a plurality of translated hypotheses; and appending the plurality of translated hypotheses as results to the one or more results.

12. A computer-implemented method, comprising:

receiving, at a computing device, a user input and a grammar including annotations, the user input comprising audio data and the annotations providing syntax and semantics to the grammar;

retrieving, from computer memory, an existing statistical language model (SLM) that is based on the grammar;

retrieving third-party statistical speech recognition information from a computer-readable storage device that is transmitted to the computing device over a network, the third-party statistical speech recognition information including query streams input to web-based query web sites;

updating the existing SLM based on the statistical speech recognition information transmitted over the network;

processing the user input using the updated SLM to generate one or more results, the updated SLM preserves semantics of the grammar;

comparing the one or more results to candidates provided in the grammar;

identifying a particular candidate of the grammar based on the comparing;

providing the particular candidate for input to an application;

translating the user input to a second language, different than a first language of the user input;

generating a plurality of translation hypotheses based on the translating;

translating each translation hypothesis of the plurality of translation hypotheses to the first language to provide a plurality of translated hypotheses; and appending the plurality of translated hypotheses as results to the one or more results.

* * * * *